April 15, 1952     L. L. WHITNEY     2,593,374
DROP FORGED AND WELDED BRAKE HEAD
Filed June 8, 1948     3 Sheets-Sheet 1
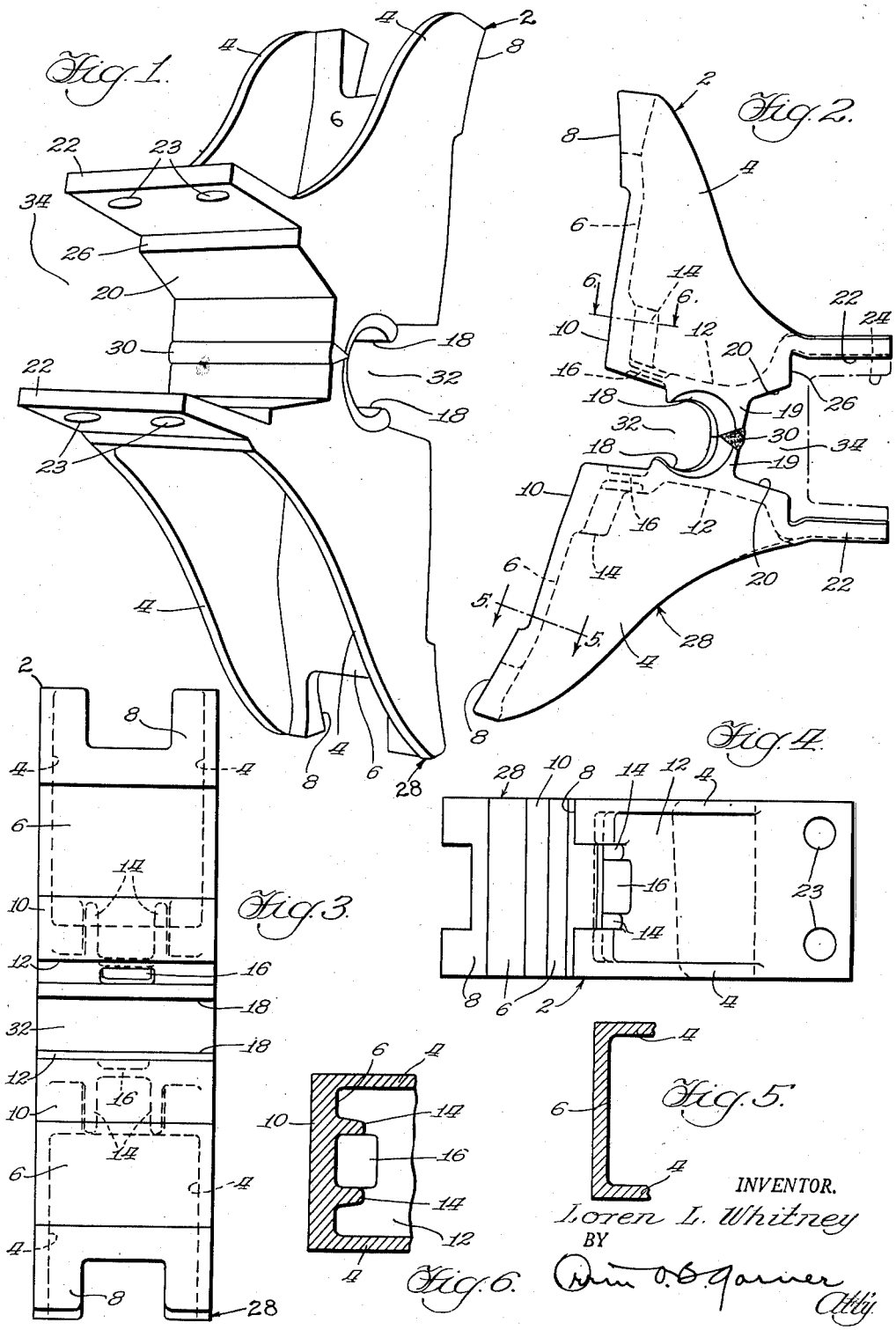
INVENTOR.
Loren L. Whitney April 15, 1952     L. L. WHITNEY     2,593,374
DROP FORGED AND WELDED BRAKE HEAD
Filed June 8, 1948     3 Sheets-Sheet 2

INVENTOR.
Loren L. Whitney
BY
O. B. Garner
Atty.

April 15, 1952     L. L. WHITNEY     2,593,374
DROP FORGED AND WELDED BRAKE HEAD
Filed June 8, 1948     3 Sheets-Sheet 3

INVENTOR.
Loren L. Whitney
BY
Atty

Patented Apr. 15, 1952

2,593,374

UNITED STATES PATENT OFFICE 2,593,374

DROP FORGED AND WELDED BRAKE HEAD

Loren L. Whitney, Hammond, Ind., assignor to American Steel Foundries, Chicago, Ill., a corporation of New Jersey Application June 8, 1948, Serial No. 31,735

8 Claims. (Cl. 188—236)

This invention relates to railway brake equipment and more particularly to a novel brake head and method of fabricating the same.

A general object of the invention is to devise a novel fabricated brake head of economical construction and having greater strength than conventional cast steel heads for resisting the severe stresses of railway service.

Another object of the invention is to devise a novel fabricated brake head composed of a plurality of forged steel segments welded together to form a composite brake head structure of unusual strength.

A more specific object of the invention is to devise a brake head, such as above described, comprising a hanger socket and a brake beam socket with the brake head segments welded together between said sockets to form a composite brake head structure.

Still another object of the invention is to devise a novel method of fabricating brake heads by forging segments thereof and welding the segments at approximately the transverse center line of the head.

The foregoing and other objects and advantages of the invention will become apparent from a consideration of the following specification and the accompanying drawings, wherein:

Figure 1 is a rear perspective view of a fabricated brake head embodying the invention;

Figure 2 is a side elevational view of the head;

Figure 3 is a front elevational view of the head;

Figure 4 is a top plan view of the head;

Figure 7:
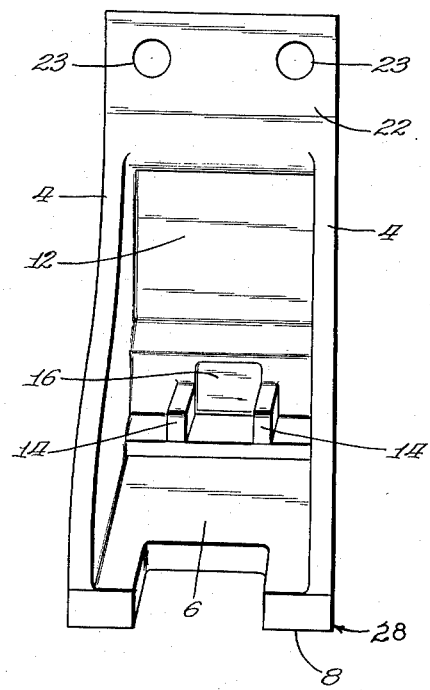
Figure 8:
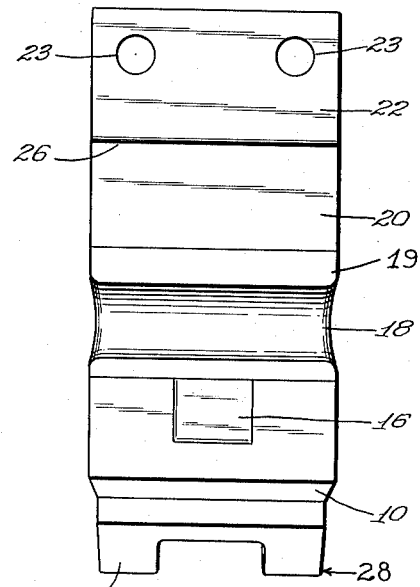
Figure 9:
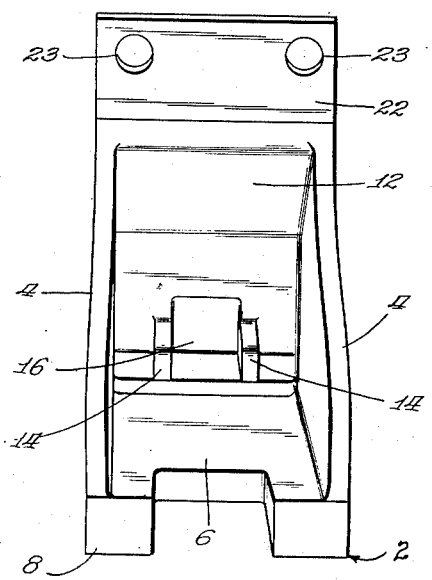
Figure 10:
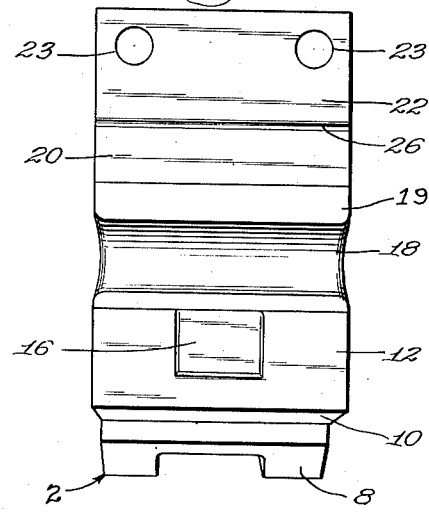
Figure 11:
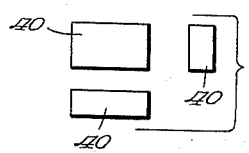
Figure 16:
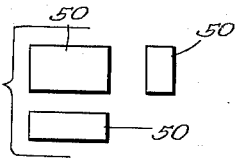
Figure 12:
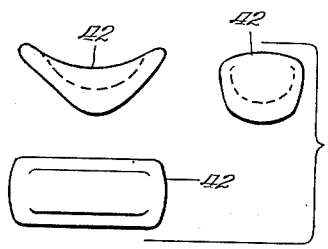
Figure 17:
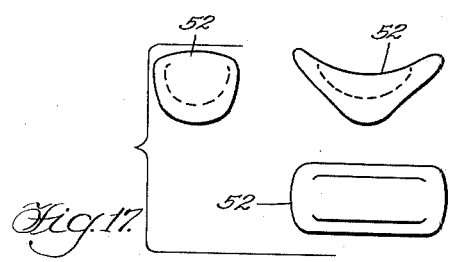
Figure 13:
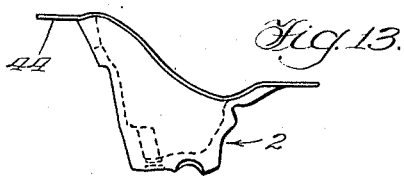
Figure 18:
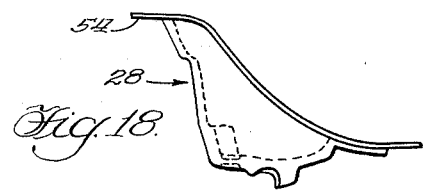
Figure 14:
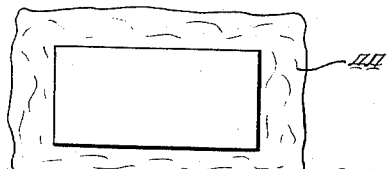
Figure 19:
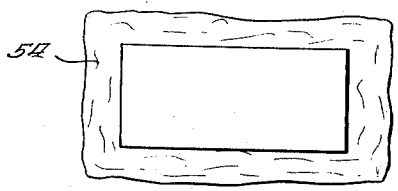
Figure 15:
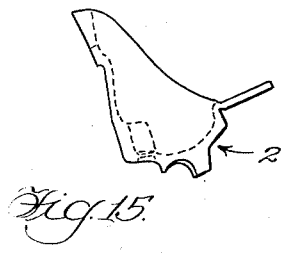
Figure 20:
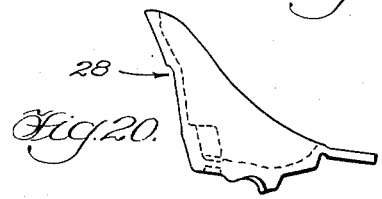
Figure 21:
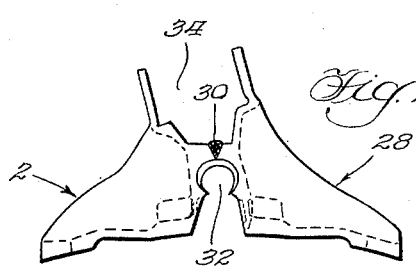

Figures 5 and 6 are sectional views taken respectively on the lines 5—5 and 6—6 of Figure 2;

Figure 7 is a bottom perspective view of the bottom brake head segment;

Figure 8 is a plan view of the bottom segment taken from the center surface thereof;

Figure 9 is a top perspective view of the top brake head segment;

Figure 10 is a plan view of the top segment taken from the center surface thereof; and Figures 11 to 21 inclusive, show the steps in a novel process by which the head is fabricated, Figure 11 showing the cut length of steel bar stock for forging the top segment of the brake head, Figure 12 showing the stock after the first forging operation, Figure 13 showing the top segment after the second or final forging operation, Figure 14 showing the flash metal trimmed from the forging shown in Figure 13, and Figure 15 showing the finished top segment, Figure 16 showing the cut length of steel bar stock for forging the bottom segment of the brake head, Figure 17 showing the bottom segment after the first forging operation, Figure 18 showing the bottom segment after the second or final forging operation, Figure 19 showing the flash metal trimmed from the forging of Figure 18, Figure 20 showing the finished bottom segment, and Figure 21 showing the finished brake head with the top and bottom segments welded together at approximately the transverse center line of the head.

Describing the invention in detail and referring first to the novel brake head construction shown in Figures 1 to 10 inclusive, the brake head comprises a top segment 2 having spaced substantially vertical lateral webs 4 and having a front wall 6 formed with a bifurcated end or toe lug 8 and an intermediate lug 10 adapted to afford seats for associated brake shoe means (not shown). The lower end of the front wall 6 is integrally formed with a transverse or bottom web 12 having spaced guide ribs 14 integrally formed therewith and with the wall 6 to reinforce the connection between the walls 6 and 12 and to afford guide means for a key (not shown) adapted to secure associated brake shoe means (not shown) in the usual manner. The web 12 is provided with a relatively thin segment 16 defining a recess between the ribs 14. The segment 16 is adapted to be punched out to form a keyway or slot, as hereinafter described in connection with fabrication of the brake head.

The lower surface of the web 12 is formed with an arcuate semi-socket 18 defined at its rear edge by a tapered projection or lug 19 adapted to be welded to a corresponding lug or a lower brake head segment 28, as hereinafter described. Rearwardly of the semi-socket 18, the web 12 is offset as at 20 and is further offset as at 22 to define a generally rectilinear semi-socket for an associated brake beam part, diagrammatically illustrated at 24 (Figure 2), the brake beam part 24 being afforded a seat against a shoulder 26 defined by the offset portions 20 and 22 of the web 12. The offset portion 22 of the web 12 is provided with spaced drill holes 23 to afford reception for suitable securing means, such as rivets (not shown), for the brake beam part 24.

The lower brake head segment, designated 28, is generally similar to the top segment 2 and corresponding parts of the bottom segment 28 are identified by corresponding numerals applied to the top segment 2, with the exception that the transverse web 12 of the bottom segment constitutes the top web thereof in view of the fact that the bottom segment is inverted, as best seen in Figures 2 and 3.

Thus it will be seen that I have devised a novel fabricated brake head wherein top and bottom segments of forged steel are welded together as at 30 (Figures 1 and 2) on substantially the transverse center line of the head between a hanger socket 32 and a brake beam socket 34. This structure not only provides an unusually tough and serviceable brake head capable of withstanding the severe usage of railway service conditions but also affords an unusually economical construction capable of competing with conventional cast steel heads from a cost standpoint.

Referring now to Figures 11 to 21 inclusive, which illustrate the process by which the novel brake head is fabricated, a bar of steel stock 40 shown in plan view, side elevation, and end view in Figure 11 is rough forged to the configuration shown at 42 in plan view, side elevation, and end view in Figure 12. This first forging step is for the purpose of pre-forming the stock for proper distribution of metal. The forging 42 is then subjected to a second or final forging operation producing the top half 2 of the brake head, as shown in Figure 13, with a flange or forging flash indicated at 44. The forging 2 is then trimmed by a pass in a trimming die thereby trimming the flash metal 44, as shown in Figure 14, and producing the finished forging 2 shown in Figure 15.

The cut bar of stock from which the bottom segment of the brake head is forged is shown in plan view, side elevation, and end view at 50 in Figure 16. This bar of stock is forged to the configuration shown in plan view, side elevation, and end view at 52 in Figure 17 for the purpose of pre-forming the stock for proper distribution of metal. The forging 52 is then subjected to a second or final forging operation producing the bottom brake head segment 28 with a flange of flash metal indicated at 54 in Figure 18. The flash metal 54 is then trimmed, as shown in Figure 19, by subjecting the forging 28 to a pass through a trimming die producing the finished bottom brake head segment indicated at 28 in Figure 20.

Figure 21 shows the top and bottom brake head segments 2 and 28 welded together at 30 to form the structure described in detail in connection with Figures 1 to 10 inclusive.

The holes 23 may be drilled and the webs 16 may be punched out to form keyways, either before or after the welding operation at 30, as may be desired, and it will be understood that the holes 23 and the webs 16 may be formed irrespective of sequence.

Thus it will be understood from a consideration of Figures 11 to 21 that I have devised a novel method of fabricating a brake head structure by independently forging top and bottom segments thereof, trimming the forgings, and welding the forgings at substantially the transverse center line of the brake head intermediate the hanger socket 32 and the brake beam socket 34 thereof to form a finished brake head.

I claim:

1. A fabricated brake head comprising top and bottom forgings each having a front wall with an end lug and an intermediate lug, a transverse web extending rearwardly from said intermediate lug, and spaced side walls connected to the transverse web and to the front wall, spaced ribs connecting each transverse wall to the rear surface of the associated front wall, a keyway through each transverse web intermediate the related ribs, the adjacent surfaces of respective webs being formed with semi-sockets defining a hanger socket, and said webs being offset rearwardly of said socket to define a brake beam socket, and a weld connecting said webs between said sockets.

2. A brake head segment comprising a front wall, a transverse web extending rearwardly therefrom and having an external portion adapted to be welded to a related segment, spaced ribs connecting the rear surface of the front wall to the transverse web, and a recess in said web intermediate said ribs defined by a relatively thin section of said web adapted to be punched out to define a keyway between said ribs.

3. A brake head segment comprising a front wall, a transverse web extending rearwardly therefrom and having an external arcuate projection having a semi-socket and adapted for welding to a projection of an associated segment, and a recess in said web adjacent its juncture with said wall and defined by a relatively thin section of said web adapted to be punched out to form a keyway through said recess.

4. A brake head segment comprising a front wall, spaced side walls connected thereto, a transverse web connected to all of said walls, a recess in said web between said side walls and defined by a portion of said web thinner than the surrounding portion thereof and adapted to be punched out to form a keyway through said recess, an arcuate semi-socket formed in said web rearwardly of the front wall, and an offset portion in said web defining a generally rectilinear semi-socket rearwardly of the first-mentioned semi-socket.

5. A brake head segment comprising a front wall, a transverse web extending rearwardly therefrom, said web having a tapered portion adapted for welding to a corresponding portion of a related segment and having a semi-socket forwardly of said tapered portion, and another semi-socket rearwardly of said tapered portion, and said web having a segment between the front wall and the tapered portion thinner than the surrounding portion of said web and adapted to be punched out to form a keyway therein.

6. A brake head comprising top and bottom forgings each having a front wall with an end lug and an intermediate lug and a transverse web extending rearwardly from the intermediate lug, and a recess in each web adjacent its intermediate lug and defined by a relatively thin web section adapted to be punched out to form a keyway through the web, and a weld connecting said transverse webs at substantially the transverse center line of the brake head intermediate the forward and rear extremities thereof, said transverse webs being free at the ends thereof remote from said front walls.

7. A brake head comprising top and bottom forgings each having a transverse web and a front wall with brake shoe positioning means, lugs on respective webs extending toward each other, and a recess in each web adjacent its juncture with its front wall and defined by a relatively thin web section adapted to be punched out to form a keyway through said recess, and a weld connecting said lugs at approximately the transverse center line of the head intermediate the forward and rear extremities thereof, said weld extending from one side to the opposite side of said head.

8. A brake head segment comprising a front wall, a transverse web extending rearwardly therefrom and having an external arcuate projection having a semi-socket and adapted for welding to a projection of an associated segment, and a relatively thin section in said web adjacent its juncture with said wall, and designed to be punched out to form a keyway.

LOREN L. WHITNEY.

REFERENCES CITED

The following references are of record in the file of this patent:

UNITED STATES PATENTS

| Number | Name | Date |
|---|---|---|
| 867,183 | Baker | Sept. 24, 1907 |
| 868,970 | Crone | Oct. 22, 1907 |
| 1,079,001 | Gallagher | Nov. 18, 1913 |
| 1,475,286 | Crone | Nov. 27, 1923 |
| 1,727,874 | Ford | Sept. 10, 1929 |
| 1,972,212 | Whitworth | Sept. 4, 1934 |
| 2,077,551 | Ekholm | Apr. 20, 1937 |
| 2,148,257 | Budd | Feb. 21, 1939 |
| 2,283,637 | Johnson | May 19, 1942 |

FOREIGN PATENTS

| Number | Country | Date |
|---|---|---|
| 198,633 | Germany | May 23, 1908 |